United States Patent
Sabbag et al.

(10) Patent No.: US 11,726,665 B1
(45) Date of Patent: Aug. 15, 2023

(54) MEMORY EXTENSION WITH ERROR CORRECTION

(71) Applicant: Amazon Technologies, Inc., Seattle, WA (US)

(72) Inventors: Erez Sabbag, Koranit (IL); Itai Avron, Petah Tikva (IL)

(73) Assignee: Amazon Technologies, Inc., Seattle, WA (US)

( * ) Notice: Subject to any disclaimer, the term of this patent is extended or adjusted under 35 U.S.C. 154(b) by 59 days.

(21) Appl. No.: 17/305,044

(22) Filed: Jun. 29, 2021

(51) Int. Cl.
*G06F 3/06* (2006.01)

(52) U.S. Cl.
CPC .......... *G06F 3/0619* (2013.01); *G06F 3/0652* (2013.01); *G06F 3/0655* (2013.01); *G06F 3/0679* (2013.01)

(58) Field of Classification Search
CPC .... G06F 3/0652; G06F 3/0655; G06F 3/0679; G06F 3/0656; G06F 3/0619
USPC .......................................................... 711/154
See application file for complete search history.

(56) References Cited

U.S. PATENT DOCUMENTS

| | | | |
|---|---|---|---|
| 2005/0097408 A1* | 5/2005 | Palin ..................... | H04B 1/7183 714/700 |
| 2014/0047040 A1* | 2/2014 | Patiejunas ............. | G06F 16/219 709/219 |
| 2014/0245097 A1* | 8/2014 | Larsen ............... | H03M 13/2906 714/755 |
| 2016/0110111 A1* | 4/2016 | Song ..................... | G06F 3/0688 711/103 |
| 2016/0261375 A1* | 9/2016 | Roethig .................. | H04L 7/041 |
| 2018/0091172 A1* | 3/2018 | Ilani ..................... | G06F 11/1068 |
| 2019/0163565 A1* | 5/2019 | Meaney ............... | G06F 11/108 |
| 2022/0091936 A1* | 3/2022 | La Fetra ............. | G06F 11/1076 |

OTHER PUBLICATIONS

Arieli, M., "On the influence of erasure correction on the probability of undetected error of Reed-Solomon codes," *Eighteenth Convention of Electrical and Electronics Engineers in Israel*, 1995, pp. 5.1.1/1-5.1.1/5, doi: 10.1109/EEIS.1995.514175.

Arieli, M., "On the relation between undetected errors and the error detection criteria of a Reed-Solomon decoder correcting errors and erasures," *Proceedings of 19th Convention of Electrical and Electronics Engineers in Israel*, 1996, pp. 467-470, doi: 10.1109/EEIS.1996.567017.

* cited by examiner

*Primary Examiner* — Hashem Farrokh
(74) *Attorney, Agent, or Firm* — Weaver Austin Villeneuve & Sampson LLP

(57) ABSTRACT

Techniques for encoding additional data in a memory without requiring an increase to the physical storage capacity of the memory device are described. Additional data can be encoded with error correction code symbols without having to physically store the additional data in memory, while retaining the number of error correction code bits used by the memory. When data is read from memory without the additional data, erasure decoding can be performed to recover the additional data. When errors are encountered in the data read from memory, the errors can be treated as erasures for different predictions of the error locations to determine if the errors can be corrected.

20 Claims, 10 Drawing Sheets

FIG. 6

| | CW0 | CW1 | CW2 | CW3 | |
|---|---|---|---|---|---|
| Device-9 | ECC-0 Byte 3 | ECC-1 Byte 3 | ECC-2 Byte 3 | ECC-3 Byte 3 | ECC data 604 |
| Device-9 | ECC-0 Byte 2 | ECC-1 Byte 2 | ECC-2 Byte 2 | ECC-3 Byte 2 | |
| Device-8 | ECC-0 Byte 1 | ECC-1 Byte 1 | ECC-2 Byte 1 | ECC-3 Byte 1 | |
| Device-8 | ECC-0 Byte 0 | ECC-1 Byte 0 | ECC-2 Byte 0 | ECC-3 Byte 0 | |
| Device-7 | Data-0 Byte 15 | Data-1 Byte 15 | Data-2 Byte 15 | Data-3 Byte 15 | stored data 602 |
| Device-7 | Data-0 Byte 14 | Data-1 Byte 14 | Data-2 Byte 14 | Data-3 Byte 14 | |
| Device-6 | Data-0 Byte 13 | Data-1 Byte 13 | Data-2 Byte 13 | Data-3 Byte 13 | |
| Device-6 | Data-0 Byte 12 | Data-1 Byte 12 | Data-2 Byte 12 | Data-3 Byte 12 | |
| Device-5 | Data-0 Byte 11 | Data-1 Byte 11 | Data-2 Byte 11 | Data-3 Byte 11 | |
| Device-5 | Data-0 Byte 10 | Data-1 Byte 10 | Data-2 Byte 10 | Data-3 Byte 10 | |
| Device-4 | Data-0 Byte 9 | Data-1 Byte 9 | Data-2 Byte 9 | Data-3 Byte 9 | |
| Device-4 | Data-0 Byte 8 | Data-1 Byte 8 | Data-2 Byte 8 | Data-3 Byte 8 | |
| Device-3 | Data-0 Byte 7 | Data-1 Byte 7 | Data-2 Byte 7 | Data-3 Byte 7 | |
| Device-3 | Data-0 Byte 6 | Data-1 Byte 6 | Data-2 Byte 6 | Data-3 Byte 6 | |
| Device-2 | Data-0 Byte 5 | Data-1 Byte 5 | Data-2 Byte 5 | Data-3 Byte 5 | |
| Device-2 | Data-0 Byte 4 | Data-1 Byte 4 | Data-2 Byte 4 | Data-3 Byte 4 | |
| Device-1 | Data-0 Byte 3 | Data-1 Byte 3 | Data-2 Byte 3 | Data-3 Byte 3 | |
| Device-1 | Data-0 Byte 2 | Data-1 Byte 2 | Data-2 Byte 2 | Data-3 Byte 2 | |
| Device-0 | Data-0 Byte 1 | Data-1 Byte 1 | Data-2 Byte 1 | Data-3 Byte 1 | |
| Device-0 | Data-0 Byte 0 | Data-1 Byte 0 | Data-2 Byte 2 | Data-3 Byte 4 | |
| | Metadata Byte 0 | Metadata Byte 1 | CRC Byte 0 | CRC Byte 1 | erased data 606 |

600

| | | CW0 | CW1 | CW2 | CW3 | |
|---|---|---|---|---|---|---|
| 700 | Device-9 | ECC-0 Byte 3 | ECC-1 Byte 3 | ECC-2 Byte 3 | ECC-3 Byte 3 | ECC data 704 |
| | | ECC-0 Byte 2 | ECC-1 Byte 2 | ECC-2 Byte 2 | ECC-3 Byte 2 | |
| | Device-8 | ECC-0 Byte 1 | ECC-1 Byte 1 | ECC-2 Byte 1 | ECC-3 Byte 1 | |
| | | ECC-0 Byte 0 | ECC-1 Byte 0 | ECC-2 Byte 0 | ECC-3 Byte 0 | |
| | Device-7 | Data-0 Byte 15 | Data-1 Byte 15 | Data-2 Byte 15 | Data-3 Byte 15 | stored data 702 |
| | | Data-0 Byte 14 | Data-1 Byte 14 | Data-2 Byte 14 | Data-3 Byte 14 | |
| | Device-6 | Data-0 Byte 13 | Data-1 Byte 13 | Data-2 Byte 13 | Data-3 Byte 13 | |
| | | Data-0 Byte 12 | Data-1 Byte 12 | Data-2 Byte 12 | Data-3 Byte 12 | |
| | Device-5 | Data-0 Byte 11 | Data-1 Byte 11 | Data-2 Byte 11 | Data-3 Byte 11 | |
| | | Data-0 Byte 10 | Data-1 Byte 10 | Data-2 Byte 10 | Data-3 Byte 10 | |
| | Device-4 | Data-0 Byte 9 | Data-1 Byte 9 | Data-2 Byte 9 | Data-3 Byte 9 | |
| | | Data-0 Byte 8 | Data-1 Byte 8 | Data-2 Byte 8 | Data-3 Byte 8 | |
| | Device-3 | Data-0 Byte 7 | Data-1 Byte 7 | Data-2 Byte 7 | Data-3 Byte 7 | |
| | | Data-0 Byte 6 | Data-1 Byte 6 | Data-2 Byte 6 | Data-3 Byte 6 | |
| | Device-2 | Data-0 Byte 5 | Data-1 Byte 5 | Data-2 Byte 5 | Data-3 Byte 5 | |
| | | Data-0 Byte 4 | Data-1 Byte 4 | Data-2 Byte 4 | Data-3 Byte 4 | |
| | Device-1 | Data-0 Byte 3 | Data-1 Byte 3 | Data-2 Byte 3 | Data-3 Byte 3 | |
| | | Data-0 Byte 2 | Data-1 Byte 2 | Data-2 Byte 2 | Data-3 Byte 2 | |
| | Device-0 | Data-0 Byte 1 | Data-1 Byte 1 | Data-2 Byte 1 | Data-3 Byte 1 | |
| | | Data-0 Byte 0 | Data-1 Byte 0 | Data-2 Byte 0 | Data-3 Byte 0 | |
| | | Metadata Byte 0 | CRC-0 Byte 0 | Metadata Byte 1 | CRC-1 Byte 0 | erased data 706 |

FIG. 7

MEMORY EXTENSION WITH ERROR CORRECTION

BACKGROUND

Memory devices and modules can be designed to support data transfers for a certain data bus width that is compatible with a computing system (e.g., to support the data bus width of a processor). Memory errors can occur when one or more bits of a block of data stored in memory are flipped from 0 to 1 or vice versa. For instance, soft errors may occur when charged particles from radiation rays interact with a memory device, or hard errors may occur due to a defect or a faulty memory device. Depending on what the data stored in the memory is used for, errors can be tolerated to a certain extent or may necessitate replacement of the memory, e.g., swapping in a new memory module. Error correction codes (ECCs) can be implemented to allow recovery of the original data in some instances. ECCs can be used to identify a certain number of error locations, and hence allow the erroneous bits to be corrected.

BRIEF DESCRIPTION OF THE DRAWINGS

Various embodiments in accordance with the present disclosure will be described with reference to the drawings, in which:

FIG. 6 illustrates an example of a data structure having erased data for storage across multiple memory devices;

FIG. 7 illustrates another example of a data structure having erased data for storage across multiple memory devices;

DETAILED DESCRIPTION

Figure 1:
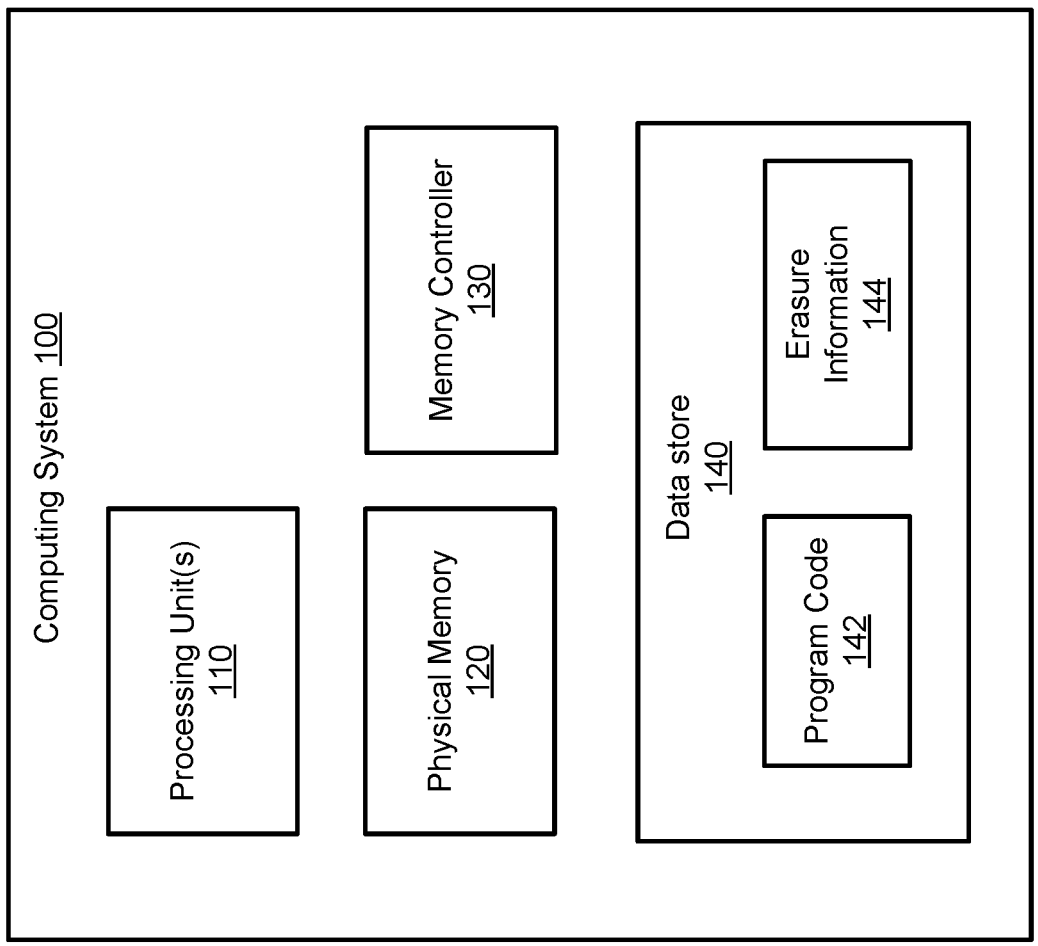
FIG. 1 illustrates a simplified block diagram of an example of a computing system that uses erasure information.

When the architecture of a computing system changes, or when a feature of a computing system is added or modified, the amount of data that is transferred to or from memory in a data cycle may change. For example, the number of data bits being transferred in a data cycle may need to be increased to support a new feature implemented by a processor architecture. One way to increase the number of data bits being transferred in a data cycle is to increase the number of memory devices implemented in the system. For example, a memory module can add an additional memory chip to support the increase in the number of data bits that can be transferred in a data cycle. However, this may render legacy memory modules incompatible with the new computing system. Another way to increase the number of data bits being transferred is to store the additional data on a separate memory component, but this may require performing a first read to a legacy memory module and a second read to the separate memory component to obtain that additional data. In either implementation, additional physical storage capacity is used to support the additional data bits. For memory modules that support error correction, the number of error correction bits stored in the memory can be reduced to support the additional data bits. However, doing so may detrimentally reduce system reliability.

The techniques disclosed herein allow a memory device to support additional data without requiring an increase to the physical storage capacity of the memory device while still providing comparable error correction capabilities for a given error correction scheme. Erasure decoding refers to the process of using an error correction code to correct an error when the location of the error is known ahead of time. For a given ECC scheme, the error correction capability for random errors (errors at unknown locations) is usually less than the error correction capability for erasures. For example, an ECC scheme may have the capability to correct up to two errors when the locations are unknown, but can correct up to four erasures when the locations are known, or up to one error and two erasures. By taking advantage of the erasure decoding capability, additional data can be encoded with the ECC symbols without having to physically store the additional data in memory. When data is read from memory without the additional data, erasure decoding can be performed to recover the additional data. In some implementations, utilizing erasure decoding in such a manner can reduce the error correction capability of the memory. For instance, referring to the example ECC scheme mentioned above, instead of being able to correct up to two errors with unknown locations, the same ECC scheme may only be able to correct one random error because an erasure has already been applied for recovery of the additional data. In other words, if two errors with unknown locations are encountered, the memory would not be able to both correct the two errors and recover the additional data. In such a scenario, to recoup some of the error correction capability, the techniques disclosed herein can process the random errors as erasures. Erasure decoding can then be performed for different predictions of the error locations to determine if the error can be corrected. Hence, by treating the errors as if they are erasures, the ECC scheme can be used to both extend the amount of data stored using the memory without increasing the physical storage capacity, and maintain a similar level of error correction capability in certain scenarios.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Reed-Solomon codes are one example of an ECC designed to exploit knowledge of erasure locations. Other types of ECC that can be used include Bose-Chaudhuri-Hocquenghem (BCH), low density parity check (LPDC), turbo codes, polar codes, or other suitable coding scheme that provides error correction capability. Reed-Solomon codes are sometimes used to implement ECC schemes for dynamic random-access memory (DRAM) and other types of memory devices. When Reed-Solomon encoding is used to encode a block of data having k number of data symbols (each symbol being one or more bits in length), using 2t number of check symbols to form an encoded message n symbols in length, the maximum number of errors that can be detected and corrected for the block of data (i.e., incorrect values at unknown locations) is equal to the floor of t. However, when the errors are erasure errors whose locations are known in advance, the maximum number of erasure errors that can be corrected by applying erasure decoding to a Reed-Solomon code is equal to 2t. If the errors include a combination of erasure errors and unknown errors, then the maximum number of correctable errors is somewhere between t and 2t. Thus, knowledge of erasure locations leads to an increase in the number of errors that can be corrected relative to trying to detect and correct errors that are unknown.

An ECC codeword includes a combination of data symbols and error checking or parity symbols. The ECC codeword as stored in memory or as read out of memory may include errors such as bit flips. The process of decoding an ECC to detect unknown errors and to correct any detected errors is referred to as error decoding. The same decoding algorithm that is used for computing error magnitudes during error decoding can be used for computing error magnitudes during erasure decoding when erasure locations are provided as input to the decoding algorithm.

FIG. 1 is a simplified block diagram of an example computing system 100 that can be used to implement the techniques disclosed herein. Computing system 100 includes one or more processing units 110, a physical memory 120, a memory controller 130, and a data store 140. In some implementations, a computing system may include more or fewer components, combine components, or have a different arrangement of components. In some instances, computing system 100 may be implemented using user-replaceable and/or modular components such as memory modules containing memory chips. Computing system 100 can be a server, a desktop computer, a laptop, a mobile phone, and the like. In some instances, the computing system 100 may be implemented as a system-on-chip (SoC). Additionally, although FIG. 1 shows the components of computing system 100 as being in the same block, the computing system 100 can be implemented as a distributed computing system in which components are not co-located.

Processing units 110 can include general purpose processors (e.g., a central processing unit (CPU), special purpose processors (e.g., a digital signal processor (DSP) or graphics processing unit (GPU), microcontrollers, and the like. Processing units 110 can include a combination of different types of processors, for example, a CPU in combination a GPU and a DSP. The processing unit(s) 110 can be configured to execute instructions (e.g., program code 142) stored in the data store 140.

Physical memory 120 can include volatile memory, non-volatile memory, or both. For instance, physical memory 120 can include random-access memory such as DRAM, static random-access memory (SRAM), flash memory, etc., or various combinations thereof. In some instances, physical memory 120 may include a read-only memory (ROM). Physical memory 120 can be formed using a plurality of memory devices, where each memory device in physical memory 120 is a memory chip/die or other discrete storage device. For example, physical memory 120 can include one or more memory modules such as dual in-line memory modules (DIMMs) or single in-line memory modules (SIMMs). Each memory module can include multiple memory devices. For instance, DRAM modules often include four, eight, or an even greater number of DRAM chips/dies.

Physical memory 120 can be assigned an address space, for example, by a processing unit 110. The address space can be allocated among the various memory devices that form physical memory 120. For instance, a first memory module could be assigned an upper address range and a second memory module assigned a lower address range, with the upper address range and the lower address range being distributed across the memory devices that form the first memory module and the second memory module, respectively. Data accessed as part of executing instructions by processing unit(s) 110 can be stored in a distributed fashion across the memory devices such that, for a given instruction, multiple memory locations may be read from and/or written to, with the multiple memory locations being locations in the same memory device or different memory devices.

Memory controller 130 can be configured to manage memory accesses, including read operations and write operations. The memory accesses can be triggered based on requests from processing unit(s) 110. Memory controller 130 can control the rate of data transfer between physical memory 120 and processing unit(s) 110. For example, memory controller 130 can implement a read buffer and/or a write buffer such the rate at which data is read from or written to physical memory 120 differs from the rate at which memory controller 130 receives data from or sends data to processing unit(s) 110. In some instances, memory controller 130 is a direct memory access (DMA) controller. With DMA, a processing unit initiates a data transfer and receives an interrupt once the data transfer is complete. The processing unit can perform other operations while the data transfer is underway. Memory controller 130 can also be configured to perform operations to optimize utilization of physical memory 120, such as transferring data directly from one memory device to another to redistribute the data without passing the data through processing unit(s) 110. Furthermore, in some implementations, memory controller 130 may implement virtual addressing, for example, by translating virtual memory addresses to corresponding physical addresses associated with physical memory 120.

In some implementations, memory controller 130 is configured to perform error decoding and erasure decoding in connection with accessing physical memory 120. For instance, memory controller 130 may include hardware and/or software for implementing an ECC encoder and a corresponding ECC decoder. Memory controller 130 may use the ECC encoder to encode data being written to the physical memory. When encoded data is read from the physical memory, memory controller 130 may use the ECC decoder to decode the encoded data, detect errors, and attempt error correction. In some implementations, encoded data is stored in the physical memory as Bose-Chaudhuri-Hocquenghem (BCH) codes or Reed-Solomon codes (Reed-Solomon code being a specific type of BCH code). However, memory controller 130 may be configured to generate other types of ECCs such as low density parity check (LPDC), turbo codes, polar codes, or other suitable coding scheme that provides error correction capability.

Data store 140 can include program code 142 executed by processing unit(s) 110. Program code 142 can include software applications, drivers, an operating system, and the like. As shown in FIG. 1, data store 140 can also include erasure information 144. Erasure information indicates locations in the physical memory 120 that are associated with errors which can be corrected using erasure decoding. Erasure information 144 can be stored in the form of a table or other data structure and can come from one or more sources. In some instances, erasure information 144 may be initialized to include erasure information supplied by a computing device external to memory controller 130, such as a processor of computing system 100 or a processor of a computing system in communication with computing system 100 (e.g., over a network). For example, erasure information indicating error locations corresponding to defects identified by a memory device manufacturer during post-manufacturing testing (and that are within an acceptable tolerance range for the total number of such defects) could be written to a table each time the computing system 100 is booted up, and the memory controller could update the erasure information in the table to include additional errors that the memory controller detects during runtime. The erasure information for initializing the table can be stored separately from the table itself and can written to the table by the external computing device as part of a boot operation. Alternatively, the table can be pre-populated so that the initial erasure information is permanently stored as part of the table.

Although depicted as a separate block, the data store 140 may, in some implementations, be integrated into the physical memory 120. For instance, program code 142 may be stored in ROM and read into RAM for runtime execution. Similarly, the erasure information 144 may be stored in RAM or ROM. In other implementations, the program code 142 and/or the erasure information 144 may be stored on a hard drive, a flash memory, or other storage device that is separate from the physical memory 120.

Memory controller 130 can access the erasure information 144 in connection with performing a read operation on the physical memory 120. For instance, memory controller 130 may be configured to periodically read from the data store 140 to obtain updated erasure information 144 and to reference the obtained erasure information in connection with a subsequent read operation. Memory controller 130 can access erasure information 144 each time a read operation is to be performed. Alternatively, memory controller 130 may perform multiple read operations between successive accesses to erasure information 144. The obtained erasure information can be provided as "side information" to the ECC decoder of memory controller 130 and can be generated based on detection of errors in ECCs. Such detection may be performed by memory controller 130 itself or some other component (e.g., a processing unit 110) that receives data read via memory controller 130. For example, an error that is in a particular location of the physical memory 120 may initially be unknown when reading from the particular location, but the location can, in some instances, be identified as a result of memory controller 130 performing error decoding on an ECC read from the particular location. Accordingly, in some implementations, memory controller 130 can be configured to update erasure information 144 stored in the data store 140, based on errors detected after reading from the physical memory 120. In some implementations, erasure information 144 can be stored in memory controller 130 itself, or be distributed between data store 140 and the memory controller 130.

Figure 2:
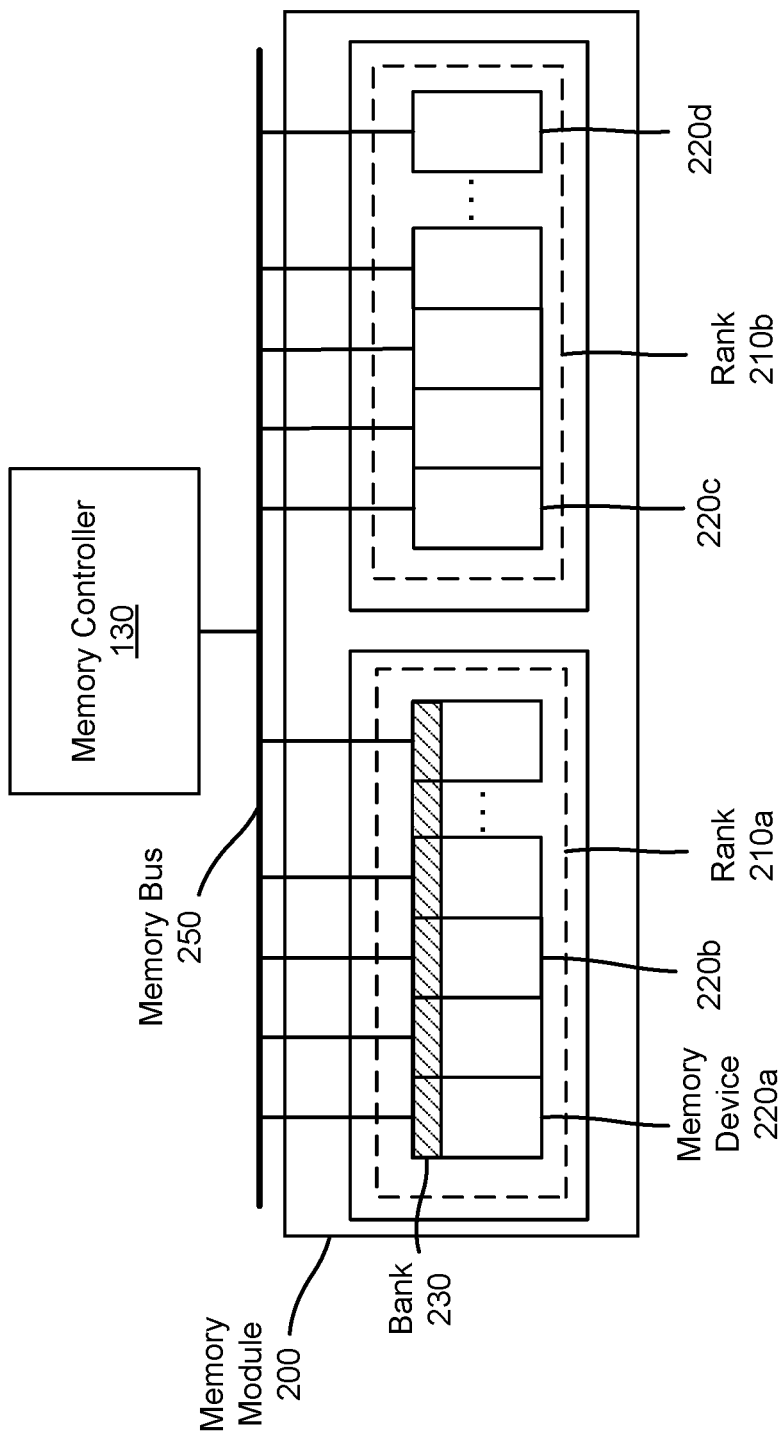
FIG. 2 illustrates an example of a memory arrangement.

FIG. 2 illustrates an example memory arrangement that is representative of how a physical memory (e.g., physical memory 120 of FIG. 1) might be configured. In FIG. 2, the memory controller 130 is coupled to a memory module 200 via a memory bus 250. Memory bus 250 can be configured to convey data between memory controller 130 and memory module 200. Memory bus 250 or a separate communication bus (not shown) may carry commands (e.g., read or write commands) generated by memory controller 130. Such commands may cause data to be read onto memory bus 250 from memory module 200 or cause data on memory bus 250 to be written into memory module 200. For instance, a read command may indicate an address in an address space associated with memory module 200. Memory bus 250 may couple memory controller 130 to multiple memory modules 200 that form physical memory. In some instances, memory controller 130 or some of the functionalities of memory controller can be implemented on memory module 200. For example, ECC encoding and decoding functionalities and/or erasure information that are implemented on memory controller 130 in some implementations can be implemented on memory module 200 in other implementations.

Memory module 200 may be a DIMM, a SIMM, or other module containing memory devices mounted on a circuit board. In some implementations, memory module 200 can be a high-bandwidth memory (HBM). As shown in FIG. 2, memory module 200 can include a plurality of memory devices 220 (e.g., memory devices 220a-220d, each on which can be a DRAM chip). Memory bus 250 can be configured to permit memory controller 130 to issue multiple commands in parallel. Commands issued in parallel can include read commands, write commands, or a combination of read and write commands. Commands issued in parallel can be directed to locations in the same memory device 220, in different memory devices 220, or in different memory modules 200. When commands are issued in parallel, memory controller 130 can use erasure information 144 to concurrently determine whether locations to be accessed are associated with erasure errors. For example, memory controller 130 may issue a command for a read operation. Prior to issuing the command for the read operation or, alternatively, after issuing the command but before decoding data returned from physical memory 120 in response to the command, memory controller 130 can reference erasure information to determine whether a location that is the subject of the read operation is associated with an erasure error.

Figure 3:
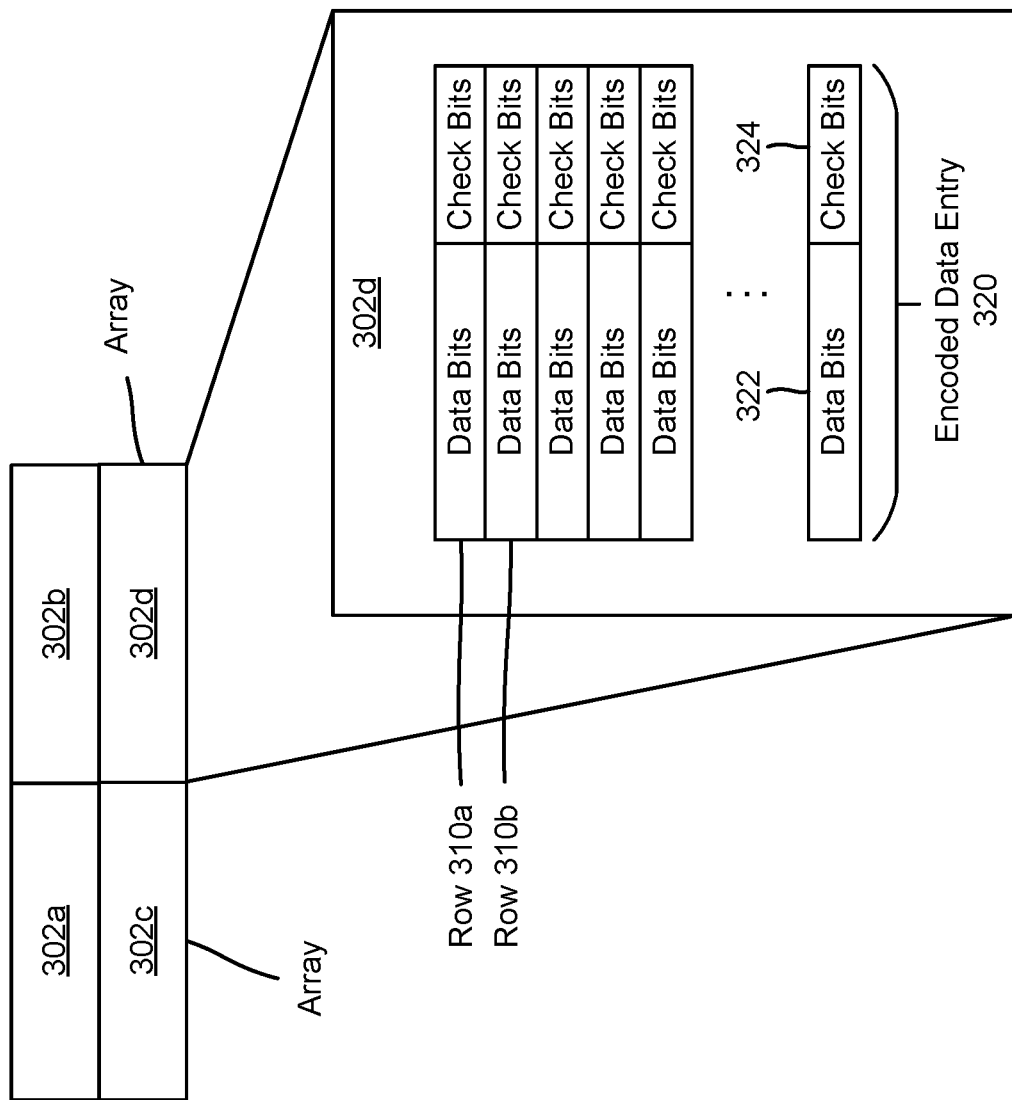
FIG. 3 illustrates an example of how data generated using ECC encoding can be stored.

A group of memory devices 220 can form a rank 210 (e.g., ranks 210a and 210b). Within a rank 210, different portions of memory devices 220 can form banks 230. For simplicity, only one bank 230 is shown in FIG. 2. Banks can be divided into arrays. For instance, the portion of memory device 220a that corresponds to bank 230 can include a plurality of arrays (e.g., four or more arrays, as shown in FIG. 3). Each array can be configured to store blocks of data that are accessible via row selection signals and column selection signals, which can be generated by memory controller 130. Alternatively, the selection signals can be generated locally within a memory device 220 based on decoding of addresses indicated in commands received from memory controller 130. For instance, each memory device 220 can include a row decoder, a column decoder, a multiplexer, and the like.

FIG. 3 illustrates an example of how data generated using ECC encoding can be stored in physical memory. In FIG. 3, memory arrays 302a-302d are configured to store data bits (e.g., original data) and check bits (e.g., parity symbols). For instance, an array 302 can be organized in rows 310 (e.g., rows 310a and 310b), with each row 310 being configured to store an encoded data entry 320 comprising a sequence of data bits 322 followed by a sequence of check bits 324. Check bits 324 can also be referred to as error correction code data.

An ECC encoder can generate each encoded data entry 320 by using a generator polynomial $g(x)$ to transform an original data sequence $i(x)$ into a codeword $c(x)$ corresponding to the encoded data entry 320. The coefficients of the generator polynomial can be represented as a coding matrix. Although the entire encoded data entry 320 can be treated as a codeword, the output of an ECC encoder usually preserves the original data, e.g., so that the bits in an original data sequence have a one-to-one correspondence with the data bits 322, assuming the data bits 322 are written to memory correctly. FIG. 3 shows each sequence of check bits 324 as being stored after (appended to) its corresponding sequence of data bits 322. However, in some implementations, check bits 324 may be stored separately or in a different order.

In the example of FIG. 3, the entirety of a codeword (e.g., encoded data entry 320) is stored in an array on a single memory device. However, as discussed earlier, data can be stored in a distributed manner across multiple memory devices. For example, the encoded data entry 320 could be stored in two or more of the memory devices 220 in FIG. 2 using data striping, so that reading the encoded data entry 320 involves concurrent or parallel reads to corresponding locations in different memory devices 220.

A received version r(x) of the codeword c(x) as read out of memory corresponds to the sum of the codeword c(x) plus an error polynomial e(x). An ECC decoder can execute one of various algorithms, such as the Berlekamp-Massey algorithm or Euclid's algorithm, to compute an error locator polynomial. The ECC decoder can calculate the roots of the error locator polynomial based on solving a system of linear equations to identify error locations. Error locations can then be input to a separate algorithm (e.g., the Forney algorithm) to compute error magnitudes/values for the error locations based on solving another system of linear equations. The error locations that are input to this separate algorithm can include error locations which are known in advance (e.g., erasure errors) or error locations identified as a result of solving for the roots of the error locator polynomial. If the total amount of errors does not exceed the code correction capability, the errors can then be corrected through computing the error polynomial e(x) using the error locations and the error magnitudes at those locations.

Figure 4:
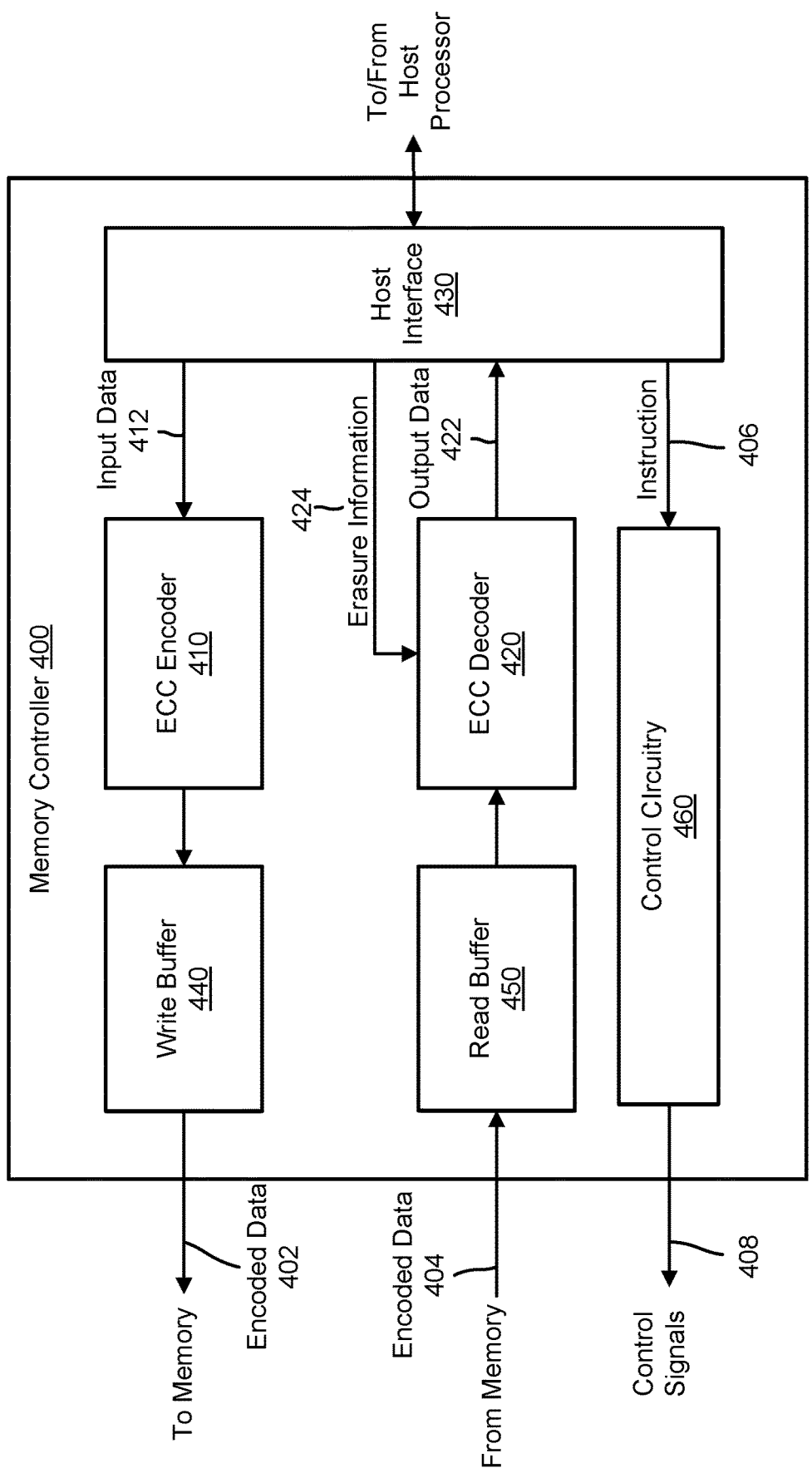
FIG. 4 illustrates a simplified block diagram of an example of a memory controller.

FIG. 4 is a simplified block diagram of a memory controller 400 according to an embodiment. The memory controller 400 may correspond to the memory controller 130 in FIG. 1. Memory controller 400 includes an ECC encoder 410, an ECC decoder 420, a host interface 430, a write buffer 440, a read buffer 450, and control circuitry 460.

Host interface 430 can couple the memory controller 400 to one or more host processors (not shown). For instance, the host interface 430 can be connected to a communication bus shared by multiple host processors. The host processors may correspond to the processing unit(s) 110 in FIG. 1. For example, in a computing system such as the computing system 100, the host interface 430 may be configured to communicate data and instructions between the memory controller 400 and a CPU, a GPU, a processor of a hard drive controller, and the like. In some implementations, the memory controller 400 and the one or more host processors may reside on different computing systems or devices. For instance, the memory controller 400 can be part of an integrated circuit device that performs memory management operations on behalf of a processor in a host system. Memory managed by the memory controller 400 (e.g., the physical memory 120 in FIG. 1) can reside on the same computing system or device as the memory controller 400, on the host system, or on a computing system or device separate from both the memory controller 400 and the host system.

Host interface 430 can be configured to communicate wirelessly or through wireline connections such as the above-mentioned communication bus. Data communicated between the memory controller 400 and a host processor via the host interface 430 can include input data 412 supplied by the host processor for writing into physical memory and/or output data 422 requested to be read out of physical memory by the host processor.

Control circuitry 460 can be configured to issue read commands and/or write commands to physical memory based on an instruction 406 received from a host processor. For example, the instruction 406 can be a macro instruction that can be executed using atomic memory operations, for example, a sequence of read and/or write operations to specific addresses within an address space associated with the physical memory. Upon receipt of such a macro instruction, control circuitry 460 may decode the macro instruction to generate commands for implementing the atomic memory accesses. In the embodiment of FIG. 4, the commands are issued in the form of control signals 408, which can be communicated to the physical memory via a communication bus such as the memory bus 250 in FIG. 2. The physical memory can, in response to receiving the control signals 408, configure itself to receive encoded data 402 for writing into a memory location indicated by the control signals 408 or to supply encoded data 404 from a memory location indicated by the control signals 408.

ECC encoder 410 can be implemented in software, hardware, or a combination of software and hardware. The ECC encoder 410 can be configured to generate ECCs by encoding the input data 412 received via the host interface 430. In some implementations, the ECC encoder 410 may include circuitry (e.g., an application-specific integrated circuit (ASIC) or a field-programmable gate array (FPGA)) configured to execute an ECC encoding algorithm such as a Reed-Solomon encoding algorithm. The ECC encoding algorithm executed by the ECC encoder 410 can output ECCs as encoded data 402. The encoded data 402 may correspond to, for example, the encoded data entry 320 in FIG. 3. In other implementations, an ECC encoding algorithm may be implemented in program code, with the program code being executable by a processing unit local to the ECC encoder 410 or by control circuitry 460.

Write buffer 440 can be configured to temporarily store the encoded data 402 for transmission to the physical memory. For example, the write buffer 440 may store the encoded data 402 in a queue and dequeue the encoded data 402 based on a rate at which the physical memory can consume such data. In some implementations, a separate write buffer (not depicted) may be coupled to the input side of the ECC encoder 410 to provide buffering for the input data 412.

ECC decoder 420 can be implemented in software, hardware, or a combination of software and hardware. The ECC decoder 420 can be configured to decode the encoded data 404 supplied from the physical memory (e.g., the encoded data entry 320 as read out of array 302d). The decoding of the encoded data 404 produces output data 422 for output to a host processor via the host interface 430. As with the ECC encoder 410, in some implementations, the ECC decoder 420 may include circuitry configured to execute an ECC decoding algorithm such as a Reed-Solomon decoding algorithm. For instance, as discussed above, decoding of Reed-Solomon codes can involve error decoding or erasure decoding and can be performed using one or more algorithms configured to detect error locations, calculate error magnitudes, and/or correct errors. In other implementations, an ECC decoding algorithm may be implemented in program code, with the program code being executable by a processing unit local to the ECC decoder 420 or by control circuitry 460. For example, error location detection, error value calculation, and error correction can be implemented as software routines executed by a processor in ECC decoder 420.

As discussed above, erasure decoding involves use of erasure information indicating known locations of errors that are correctable through erasure decoding, and a memory controller can be configured to detect such errors based on reading data from memory. Accordingly, in some embodiments, the ECC decoder 420 may be configured to generate and/or update erasure information. For example, ECC decoder 420 may, based on recognizing an error (e.g., erroneous bits having incorrect values) in the encoded data 404, flag a location from which the encoded data 404 was read as potentially being associated with an erasure error. If repeated accesses to the same location result in the same error (e.g. a threshold number of occurrences of the same error are encountered), the ECC decoder 420 may deem the location as having an erasure error and update stored erasure information to mark the location as being an erasure location. For example, the ECC decoder 420 could, after flagging a particular location, read a "new" ECC from the particular location, perform error decoding on the new ECC to determine that the same error (e.g., the same erroneous bits) is repeated in a result of the error decoding performed on the new ECC, and then in response, cause the memory controller to update the erasure information to indicate that the particular location is associated with an erasure error. If the new ECC is read before the data in the particular location gets overwritten, then the new ECC should be the same as the previously read ECC, assuming that the particular location does not experience any more errors between the earlier read and the subsequent read. However, the new ECC could be different from the previously read ECC due to the data in the particular location being overwritten, in which case the error in the new ECC may involve one or more erroneous bits that are different in value than the erroneous bits of the previously read ECC, but which are in an identical bit position(s).

In some embodiments, the ECC decoder 420 may be configured to confirm erasure locations by issuing follow-up commands to access a location that has been flagged as potentially being associated with an erasure error. Such follow-up commands can be issued without involving a host processor. Additionally, in some embodiments, the ECC decoder 420 may receive erasure information 424 from a source external to the memory controller 400. For example, the erasure information 424 can be supplied by a host processor based on the host processor determining that the output data 422 has an erasure error. Regardless of how the erasure information is generated, the memory controller 400 may be configured to restrict the erasure decoding performed by the ECC decoder 420 to locations indicated by the erasure information. For other locations not indicated by the erasure information as being associated with an erasure error (e.g., locations for which erasure information is not available), the ECC decoder 420 can apply regular error decoding to the same ECCs that would have been decoded using erasure decoding had erasure information pertaining to such other locations been available. ECCs from such other locations can be decoded under the assumption that no erasure errors exist in these locations.

ECC decoder 420 can store erasure information in a memory of the memory controller 400 or in external memory accessible by the memory controller 400, such as the data store 140 in FIG. 1. In some embodiments, erasure information may be stored in the form of a lookup table, e.g., a table indexed according to memory address. ECC decoder 420 can be configured to output the output data 422 conditional upon there being an absence of non-recoverable errors. A result of a decoding operation performed by the ECC decoder 420 may indicate one of three scenarios. The original data (i.e., the output data 422 with no errors) may be decoded successfully, for example, decoded without error or after applying error correction. This can occur when the total number of errors is less than or equal to some maximum number of correctable errors (e.g., between t and floor(t/2) when using Reed-Solomon codes, as discussed above), with the maximum number depending on whether erasure information is available for the location being accessed.

However, if the total number of errors exceeds the maximum, the result of the decoding operation may indicate that the ECC decoder 420 was unable to recover the original data. In this scenario, the memory controller 400 may output an indication of a memory error to the host processor. Alternatively, the memory controller 400 can initiate a shutdown of the computer/machine on which the memory that was accessed (e.g., the physical memory 120) resides. The memory controller 400 can initiate the shutdown by, for example, triggering an interrupt via the host interface 430. Additionally, in some embodiments, the ECC decoder 420 or the memory controller 400 may be configured to output an indication of a memory error or initiate a shutdown in response to determining, based on erasure information, that a threshold number of erasure errors has been reached. For example, the memory controller 400 may be configured with a limit on the total number of rows that are permitted to be associated with erasure errors. Another possible scenario is that the ECC decoder 420 may be unable to detect that the maximum number of errors has been exceeded, in which case the ECC decoder 420 may permit the output data 422 to be transmitted to the host processor with "silent" errors.

Read buffer 450 can be configured to temporarily store the encoded data 404 supplied from the physical memory for decoding by the ECC decoder 420. For example, the read buffer 450 may store the encoded data 404 in a queue and dequeue the encoded data 404 based on a rate at which the ECC decoder can consume such data. In some implementations, a separate read buffer may be provided on the output side of the ECC decoder 420 to provide buffering for the output data 422.

Figure 5:
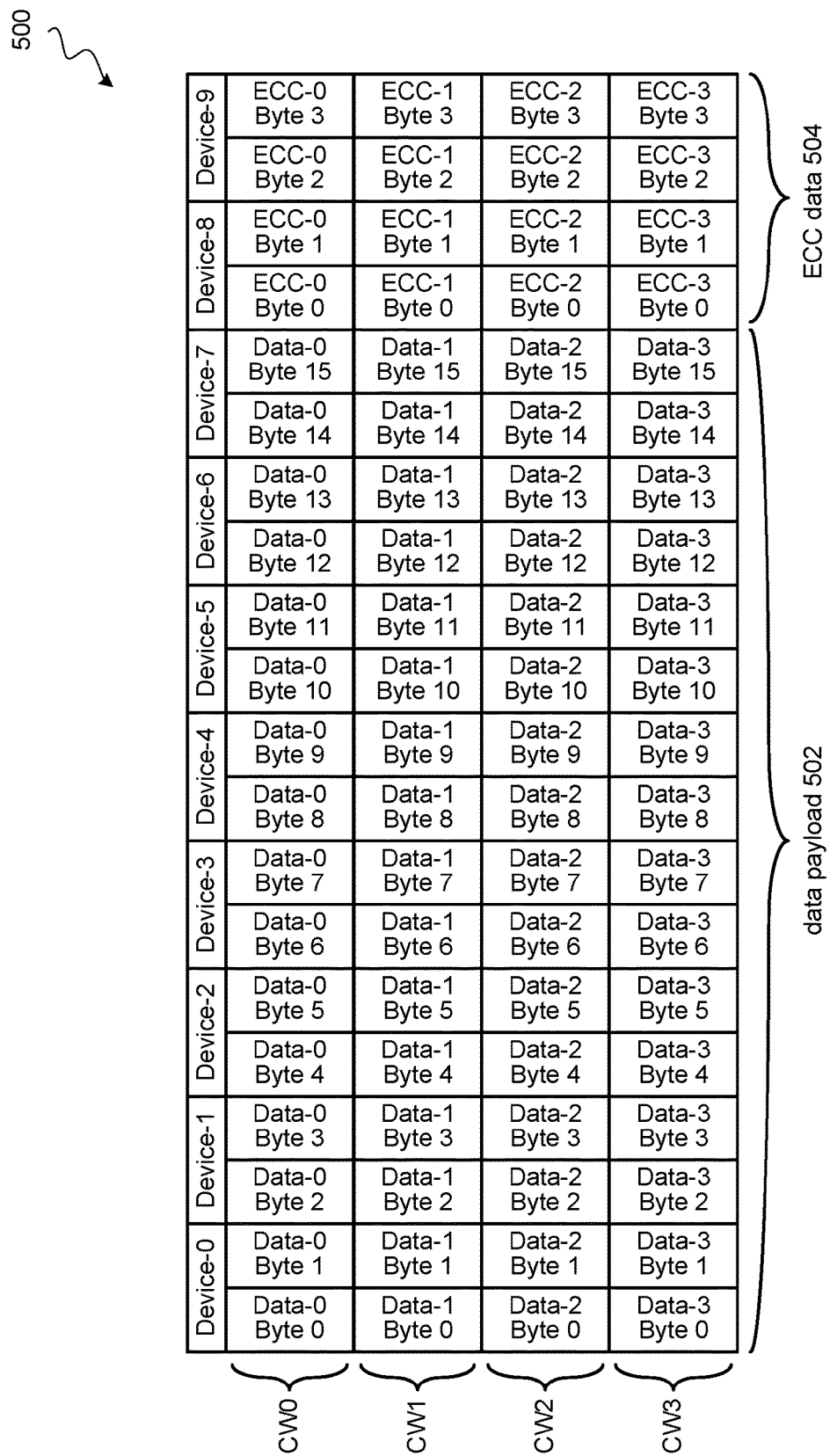
FIG. 5 illustrates an example of a data structure for storage across multiple memory devices.

FIG. 5 illustrates an example of a data structure 500 for storing data in a memory across multiple memory devices. In the example shown, ten memory devices (Device-0 to Device-9) are implemented. Each of the memory devices can be a memory chip or a memory die. In some implementations, the ten memory devices can be implemented in a memory module, and may form part of the physical memory of a computing system (e.g., physical memory 120) that has one or more such memory modules. Each memory device can be a x4 device, meaning that each memory device contributes 4 bits of data per read/write cycle. The data payload 502 shown in FIG. 5 includes 64 bytes of data, and may correspond to the size of a cache line of the computing system. The 64 bytes of data are organized into four 16-byte datawords (Data-0 to Data-3) in data structure 500. A 4-byte error correction code is generated for each dataword, and each pair of dataword and error correction code forms a 20-byte codeword.

By way of example, the first 16 bytes of data payload 502 forms dataword Data-0, and a 4-byte error correction code ECC-0 is computed for dataword Data-0. Thus, a 20-byte codeword CW0 is formed as the combination of the 16-byte dataword Data-0 and the 4-byte error correction code ECC- 0. An encoding scheme can use 8-bits of data (a byte) as a symbol size. For example, a Reed-Solomon encoding scheme RS(n, k) over Galois field $GF(2^q)$ can be used, where n is the number of symbols in the codeword, k is the number of symbols in the dataword, n−k=2t is the number of symbols in the error correction code to support detection and correction of t number of error symbols at unknown locations or 2t number of erasure symbols of known locations, and q is the number of bits in a symbol. Thus, in the example shown, Reed-Solomon RS(20,16) over $GF(2^8)$ encoding can be used to detect and correct up to two error symbols at unknown locations, or four erasure symbols at known locations. The encoding scheme can also correct one error symbol (byte) and two erasure symbols (bytes).

As shown in FIG. 5, the data payload 502 is stored across memory devices Device-0 to Device-7, and the ECC data 504 is stored in memory devices Device-8 and Device-9. Bytes 0 and 1 of the datawords are stored in Device-0. Bytes 2 and 3 of the datawords are stored in Device-1, Bytes 4 and 5 of the datawords are stored in Device-2. Bytes 6 and 7 of the datawords are stored in Device-3. Bytes 8 and 9 of the datawords are stored in Device-4. Bytes 10 and 11 of the datawords are stored in Device-5. Bytes 12 and 13 of the datawords are stored in Device-6. Bytes 14 and 15 of the datawords are stored in Device-7. Bytes 0 and 1 of the error correction code data are stored in Device-8. Bytes 2 and 3 of the error correction code data are stored in Device-9.

During a single read operation, each x4 memory device contributes 4 bits of data. Thus, during a first read operation, Device-0 may provide bits[0:1] of Data-0 Byte 0 and bits[0:1] of Data-0 Byte 1, Device-1 may provide bits[0:1] of Data-0 Byte 2 and bits[0:1] of Data-0 Byte 3, Device-2 may provide bits[0:1] of Data-0 Byte 4 and bits[0:1] of Data-0 Byte 5, Device-3 may provide bits[0:1] of Data-0 Byte 6 and bits[0:1] of Data-0 Byte 7, Device-4 may provide bits[0:1] of Data-0 Byte 8 and bits[0:1] of Data-0 Byte 9, Device-5 may provide bits[0:1] of Data-0 Byte 10 and bits[0:1] of Data-0 Byte 11, Device-6 may provide bits[0:1] of Data-0 Byte 12 and bits[0:1] of Data-0 Byte 13, Device-7 may provide bits[0:1] of Data-0 Byte 14 and bits[0:1] of Data-0 Byte 15, Device-8 may provide bits[0:1] of ECC-0 Byte 0 and bits[0:1] of ECC-0 Byte 1, and Device-9 may provide bits[0:1] of ECC-0 Byte 2 and bits[0:1] of ECC-0 Byte 3. Accordingly, a data cycle having a burst length of 4 reads can be used to read the entire codeword CW0. Similarly, a data cycle having a burst length of 8 can be used to read the first two codewords CW0 to CW1. A data cycle having a burst length of 16 can be used to read all four codewords CW0 to CW3, which may correspond to an entire cache line of the computing system.

Once an entire codeword including 16 bytes of dataword and 4 bytes of error correction code have been read, up to two erroneous bytes at unknown locations in the codeword can be detected and corrected by performing error decoding using the 4-bytes of error correction code. Alternatively, up to four erased bytes at locations known ahead of time can be corrected by performing erasure decoding (using the known locations as inputs to the error decoding process). One erroneous byte and two erased bytes can also be recovered using the 4 bytes of error correction code.

Organizing the data for storage across the ten memory devices (Device-0 to Device-9) can prolong the lifespan of the memory module. In the event that one of the memory devices has a defect or is otherwise faulty, the memory module can still be used to properly store and retrieve data. For example, suppose Device-1 is faulty after repeated errors have been found at Byte 2 and Byte 3 of datawords read from the memory. Knowing that Device-1 is faulty, erasure information can be provided to the ECC decoder to indicate that the symbols corresponding to Byte 2 and Byte 3 provided by Device-1 are erasure locations. Once this information is known, each read to the memory module may involve performing erasure decoding using the ECC data to recover Byte 2 and Byte 3 of the dataword. Because only two erasures of the error correction capability have been consumed, an additional random error occurring at any of the other byte locations can still be corrected. As such, the memory module can continue to be used in the computing system despite having a defective memory device.

It should be understood that data structure 500 is just one example of how data can be organized for storage in a memory. Other implementations may use a different number of data bytes, organize the data in a different order or arrangement, use a different number of memory devices or type of memory devices (e.g., x8 memory devices), use a different codeword or dataword length, use a different ECC encoding scheme, and/or have greater or lesser error correction capability depending on the ECC encoding scheme.

FIG. 6 illustrates an example of a data structure 600 for storing data in a memory to support additional data bits. The memory can be, for example, a DDR5 (double data rate 5) memory, or other types of memory. As shown in FIG. 6, in addition to the 64 bytes of stored data 602, 4 bytes of additional data referred to as erased data 606 can also be supported using the same number of bytes of ECC data 604 as in data structure 500. Erased data 606 are not physically stored in memory devices (Device-0 to Device-9), and are recovered using ECC data 604 during reads. Hence, data structure 600 can be used to support additional data without requiring the physical storage capacity of the memory to be increased by encoding the additional data in the ECC while retaining the same number of ECC bits as compared to data structure 500.

In some implementations, the additional data (erased data 606) can be used to support new or modified features of a processor architecture. For example, in certain processor architectures, a memory tagging extension (MTE) feature provides a 4-bit memory tag that is added for each 16 bytes of data. The MTE data can be used, for example, to improve code execution security and/or assist with software debug. For instance, MTE can be used to authenticate a data requester such that only applications having the correct memory tag can access the memory locations associated with that tag. MTE can also be used to identify different points of an execution flow associated with the memory locations for testing or debugging code. In some implementations, the memory tag can be assigned when the memory location is allocated to a processing thread or task (e.g., malloc instruction), or when the memory location is freed up (e.g., free instruction). In some implementations, MTE can also be used for memory management purposes such as tagging hot or cold pages. Although MTE is described as one example of the additional data supported by data structure 600, it should be understood that erased data 606 can be used to support other types of metadata, or even regular data where additional storage capacity may be needed.

As mentioned above, MTE can be implemented using four additional bits per 16 bytes of data. Hence, for a full cache line of 64 bytes, MTE may utilize an additional 16 bits or two bytes of MTE data. The two bytes of MTE data can be arranged as metadata Byte 0 in codeword CW0 and metadata Byte 1 in codeword CW1. Metadata Byte 0 can include a first 4-bit MTE tag for dataword Data-0, and a second 4-bit MTE tag for dataword Data-0. Metadata Byte 1 can include a third 4-bit MTE tag for dataword Data-2, and a fourth 4-bit MTE tag for dataword Data-3. This leaves two bytes of erased data 606 that can be used for other purposes. Because the metadata bytes are not stored in the physical memory and are recovered using erasure decoding, the error correction capability of errors occurring in stored data 602 may be reduced as compared to that of data structure 500. To recoup some of this reduction in error correction capability, a checksum (e.g., cyclic redundancy check) can be computed over the datawords and the metadata. In some implementations, a CRC-16 checksum can be used because two bytes of erased data 606 are available for the checksum.

Referring to FIG. 6, data structure 600 utilizes four codewords CW0 to CW3. Codeword CW0 includes Byte 0 of metadata (e.g., two 4-bit MTE tags), 16 bytes of dataword Data-0, and 4 bytes of error correction code ECC-0. Error correction code ECC-0 is computed over the combination of metadata Byte 0 and the 16 bytes of dataword Data-0. Thus, in the example shown, Reed-Solomon RS(21,17) over $GF(2^8)$ encoding can be used to detect and correct up to two error symbols at unknown locations, or four erasure symbols with known locations. The encoding scheme can also correct one error symbol (byte) and two erasure symbols (bytes).

Similarly, codeword CW1 includes Byte 1 of metadata (e.g., two 4-bit MTE tags), 16 bytes of dataword Data-1, and 4 bytes of error correction code ECC1. Error correction code ECC-1 is computed over the combination of metadata Byte 1 and the 16 bytes of dataword Data-1. Codeword CW2 includes Byte 0 of the checksum (e.g., CRC), 16 bytes of dataword Data-2, and 4 bytes of error correction code ECC2. Error correction code ECC-2 is computed over the combination of checksum Byte 0 and the 16 bytes of dataword Data-2. Codeword CW3 includes Byte 1 of the checksum (e.g., CRC), 16 bytes of dataword Data-3, and 4 bytes of error correction code ECC3. Error correction code ECC-3 is computed over the combination of checksum Byte 1 and the 16 bytes of dataword Data-3.

By way of example, when codeword CW0 is written to memory, metadata Byte 0 is not stored in the memory, and only the 16 bytes of dataword Data-0 and 4 bytes of error correction code ECC-0 are stored across the ten memory devices (Device-0 to Decive-9). When a read operation is performed to read codeword CW0, only the 16 bytes of dataword Data-0 and 4 bytes of error correction code ECC-0 are retrieved from memory. Because the location of the missing symbol corresponding to metadata byte 0 is known, erasure decoding can be performed using dataword Data-0 and error correction code ECC-0 to recover metadata Byte 0. Similarly, the rest of the erased data 606 (e.g., metadata Byte 0, checksum Byte 0, and checksum Byte 1) can be recovered using erasure decoding given the known locations of the missing symbol in the respective codewords.

When a codeword (e.g., codeword CW0) is read from memory, if the data retrieved from memory (e.g., 16 bytes of dataword Data-0 and 4 bytes of error correction code ECC-0) contains an error at an unknown location, this single random error can still be corrected using error decoding with the 4-byte error correction code. This is still possible even though one erasure has been applied to recover the erased data (e.g., metadata Byte 0), because the 4-byte error correction code is capable of correcting up to two errors at unknown locations, up to four erasures at known locations, or up to one error at an unknown location and two erasures at known locations. However, if the data retrieved from memory contains two errors at unknown byte locations, this is deemed beyond the error correction capability (e.g., 2t) of the 4-byte error correction code, because the total number of corrections here includes two error symbols and one erasure symbol.

Nevertheless, by using the spare erased data 606 to store a checksum that is calculated over the combination of the two bytes of metadata and 64 bytes of datawords Data-0 to Data-3, an error recovery attempt procedure can be performed to search for the locations of the errors in the memory. Although the two random errors in combination with the one erasure is beyond the error correction capability of the ECC, if the two random errors are treated as if they are erasures, then the total number of corrections reduces down to three erasures. In data structure 600 of FIG. 6, each codeword has twenty symbols (bytes) and hence twenty possible error locations. Treating the two random errors as two erasures means that there can be 190 different possible combinations of erasure locations. In some implementations, an error recovery attempt procedure can be performed for the 190 different combinations of erasure locations to search for the locations of the errors. To further reduce the search space, if the two errors are assumed to be the result of a defective memory device (e.g., two errors on the same memory device), then the search space reduces down to the number of memory devices.

The error recovery attempt procedure may include iteratively selecting each memory device as the potential defective memory device, and processing the two errors as two erasures at the symbol locations in the selected memory device. Erasure decoding can be performed to obtain speculative data by using the error correction code data with the assumption that the erasure locations are at the selected memory device. A verification checksum can then be computed over the speculative data and the two bytes of metadata to confirm whether the error locations are in fact at the selected memory device.

By way of example, suppose after reading the four codewords CW0 to CW3 and recovering the two bytes of metadata and two bytes of checksum, the ECC check indicates there are two random errors with unknown locations in codeword CW1. During the first iteration of the error recovery attempt procedure, the two errors are assumed to be two erasures on Device-0 (e.g., erasures at Byte 0 and Byte 1 of dataword Data-1). Erasure decoding can be performed using the two symbols (bytes) of Device-0 as the erasure locations to recover Byte 0 and Byte 1 of dataword Data-1, and the corresponding bytes read from memory are replaced with the recovered bytes obtained from erasure decoding. A verification checksum is then computed over the two bytes of metadata and the 64 bytes of data (which includes the recovered bytes). If this verification checksum matches the previously computed checksum (e.g., the two bytes of checksum in erased data 606 of codewords CW2 and CW3), then the two error locations are confirmed to be at Device-0. If errors in subsequent reads are repeatedly determined to be at the locations in Device-0, then Device-0 can be identified as a failed device (e.g., as confirmed erasure information). Further reads to the memory can then automatically trigger erasure decoding to recover the data at Device-0.

If the verification checksum does not match the previously computed checksum, then the two error locations are not at Device-0, and the error recovery attempt procedure moves on to the next device and checks Device-1 as the potential defective memory device, and so on. The error recovery attempt procedure can be performed iteratively for each of the ten memory devices Device-0 to Device-9 until a matching verification checksum is found. If after performing the error recovery attempt procedure for all ten memory devices, none of the verification checksums matches the previously computed checksum, then the two errors may be unrecoverable, and an unrecoverable error indication can be generated. For example, the unrecoverable error indication can be an interrupt or a memory fault that indicates the memory module may need to be replaced, or an interrupt that initiates a shutdown procedure. In some implementations, an unrecoverable error indication can also be generated if more than one memory device yields a matching verification checksum, and/or if the error locations on the different codewords do not align.

It should be understood that data structure 600 is just one example of how data can be organized for storage in a memory. Other implementations can implement a different number of data bytes, organize the data in a different order or arrangement, use a different number of memory devices or type of memory devices (e.g., x8 memory devices), use a different codeword or dataword length, use a different ECC encoding scheme, and/or have greater or lesser error correction capability depending on the ECC encoding scheme.

FIG. 7 illustrates another example of a data structure 700 for storing data in a memory to support additional data bits. Data structure 700 is generally similar to data structure 600, but supports half-cache line reads. Data structure 700 utilizes four codewords CW0 to CW3. Codeword CW0 includes Byte 0 of metadata (e.g., two 4-bit MTE tags), 16 bytes of dataword Data-0, and 4 bytes of error correction code ECC-0. Error correction code ECC-0 is computed over the combination of metadata Byte 0 and the 16 bytes of dataword Data-0. Codeword CW1 includes Byte 0 of checksum-0, 16 bytes of dataword Data-1, and 4 bytes of error correction code ECC1. Error correction code ECC-1 is computed over the combination of checksum-0 and the 16 bytes of dataword Data-1. In contrast to data structure 600, checksum-0 Byte 0 can be a CRC-8 that is computed over metadata Byte 0 and datawords Data-0 and Data-1. In some implementations, the 32 bytes in datawords Data-0 and Data-1 may correspond to the size of a half cache line. By implementing a checksum computed over just this portion of the data, the error recovery attempt procedure described above can be performed after reading just the two codewords CW0 and CW1. This can improve the latency when only half cache line amount of data is needed because the error recovery attempt procedure can be performed without waiting for codewords CW2 and CW3 to be read to obtain the full checksum computed over the entire 64 bytes. This can also improve memory access bandwidth because a half cache line write does not require a read-modify-write operation.

Similarly, codeword CW2 includes Byte 1 of metadata (e.g., two 4-bit MTE tags), 16 bytes of dataword Data-2, and 4 bytes of error correction code ECC-2. Error correction code ECC-2 is computed over the combination of metadata Byte 1 and the 16 bytes of dataword Data-2. Codeword CW3 includes Byte 0 of checksum-1, 16 bytes of dataword Data-3, and 4 bytes of error correction code ECC-3. Error correction code ECC-3 is computed over the combination of checksum-1 and the 16 bytes of dataword Data-3. Checksum-1 Byte 0 can be a CRC-8 that is computed over metadata Byte 1 and datawords Data-2 and Data-3.

The data structures 600 and 700 described above are also backwards compatible with data structure 500. For example, when storing data that does not require the addition bits implemented in the erased data, the same encoding scheme can be used by applying a set of zero values for the erased data. If there are no addition errors when reading the data, the error correction code data computed over the data payload can be the same as the error correction code data computed over the set of zero values and the data payload. As such, erasure decoding may not be triggered when reading the data payload from memory unless additional errors or erasures are encountered. Accordingly, the techniques disclosed herein allows legacy memory devices and modules to support additional data bits used for features like MTE, while maintaining backward compatibility when such features are not used or needed in a computing system.

Figure 8:
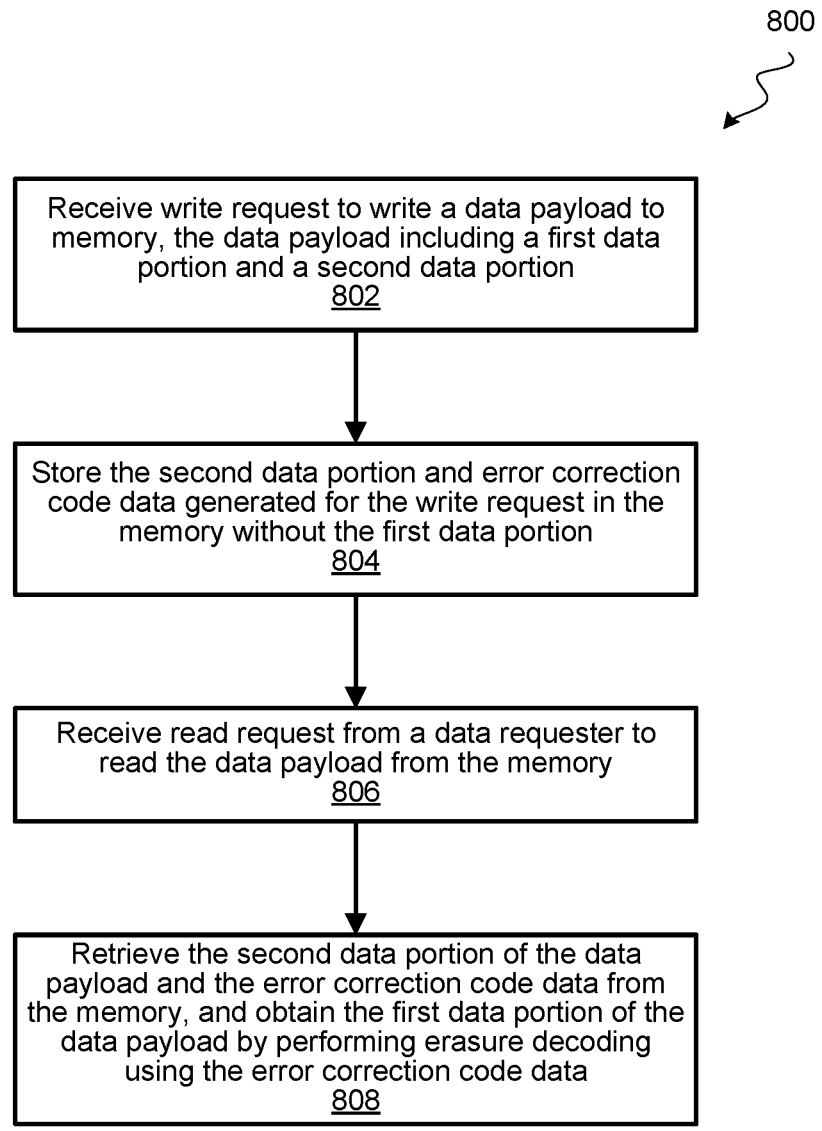
FIG. 8 illustrates a flow diagram of an example of a process for accessing memory.

FIG. 8 illustrates an example of a flow diagram of a process 800 for accessing a memory. The memory can be physical memory implemented using a number of memory devices (e.g., DDR5 or other types of memory), and each of the memory devices can be implemented using a memory chip or memory die. The memory devices can be part of a memory module or a multichip package. In some implementations, process 800 can be performed by an integrated circuit device such as a memory controller (e.g., memory controller 400), or by a memory device or memory module that integrates certain functionalities of a memory controller. In some implementations, process 800 or a portion of process 800 can be performed by an upstream device such as a processing unit or DMA engine that integrates certain functionalities of a memory controller. In some implementations, the steps of process 800 can be performed by various components of an integrated circuit device such as a system-on-chip (SoC) device.

Process 800 can be used to encode additional data in a memory while retaining the same number of error correction code bits that would otherwise be used by the memory. Process 800 may begin at block 802 by receiving a write request to write a data payload to a memory. The write request can be in the form of one or more write commands, a machine or processor instruction, or certain logic states of one or more control signals. The data payload can include a first data portion and a second data portion. The first data portion may correspond to metadata associated with the second data portion, or other data that is used by a computing system. For example, the metadata may include memory tags such as MTE data associated with the memory locations storing the second data portion. The metadata can be provided by an upstream device such as a processing unit (e.g., a processor), or generated by the integrated circuit device performing process 800 (e.g., a memory controller). The second data portion may correspond to a dataword or other granularity of data such as a half cache line or a full cache line of a computing system.

At block 804, in response to the write request, the second data portion and error correction code data generated for the write request can be stored in the memory (e.g., spread across the multiple memory devices) without the first data portion. The error correction code data can be generated, for example, by an error correction encoder of a memory controller or other integrated circuit device. In some implementations, the error correction code data can be implemented using Reed-Solomon, Bose-Chaudhuri-Hocquenghem (BCH), low density parity check (LPDC), turbo codes, polar codes, or other suitable coding scheme that provides error correction capability. The error correction code data can be computed over the data payload including the first data portion (e.g., metadata) that is not physically stored in the memory and the second data potion that is stored in the memory. In some implementations, checksum data (e.g., CRC-8, CRC-16, etc.) can also be computed over the data payload including the first data portion (e.g., metadata) and the second data portion, and the error correction code data can be computed over a data set that includes the data payload (the first data portion and the second data potion) and the checksum data. In some implementations, the checksum data is also not physically stored in the memory. By computing the error correction code data over the first data portion (e.g., metadata) and the checksum data, the first data portion (e.g., metadata) and the checksum data need not be physically stored in the memory, and can be recovered using erasure decoding.

By way of example, in some implementations, the metadata from the first data portion, the checksum, the data from the second data portion, and the error correction code data can be organized into one or more code words, such as: (1) a first codeword that includes the metadata, a first dataword of the data, and a first error correction code computed for the first code word; and (2) a second codeword that includes the checksum data (e.g., CRC-8), a second dataword of the data, and a second error correction code computed for the second code word. The two datawords in the two codewords may correspond to the data of a half cache line.

As another example, the metadata from the first data portion, the checksum, the data from the second data portion, and the error correction code data can be organized as: (1) a first codeword that includes a first portion of the metadata, a first dataword of the data, and a first error correction code computed for the first code word; (2) a second codeword that includes a second portion of the metadata, a second dataword of the data, and a second error correction code computed for the second code word; (3) a third codeword that includes a first portion of the checksum (e.g., CRC-16), a third dataword of the data, and a third error correction code computed for the third code word; and (4) a fourth codeword that includes a second portion of the checksum data (e.g., CRC-16), a fourth dataword of the data, and a fourth error correction code computed for the fourth code word. The combination of the four datawords in the fourth codewords may correspond to the data of a full cache line.

In some implementations, blocks 802 and 804 can be performed, for example, by the memory write circuitry of an integrated circuit device that is operable in both a memory extension mode and a normal mode. The operations in blocks 802 and 804 may correspond to memory write extension operations performed in the memory extension mode to provide support for additional data bits (e.g., metadata such as MTE) without requiring the additional data to be physically stored in memory. The erasure location of the erased data (e.g., the first byte of the codeword) can be preconfigured, or can be generated at the time of writing to the memory and stored as erasure information that can be used during reads to recover the erased data. In the normal mode of operation, the memory write circuitry may write to the memory without erasing any data of the write request. For example, the memory write circuitry may receive a write request to write a data payload to the memory, and in response to the write request, store the entirety of the data payload in the memory together with error correction code data generated for the data payload. In some implementations, the same ECC encoding scheme can be used for both modes of operation by encoding a set of zero values for the erased data in the normal mode of operation.

In some implementations, a configuration bit can be set, for example, by a processor to selected between the two modes. In some implementations, certain memory locations can be used for the memory extension mode while other memory locations are used for normal mode. For example, a memory address can be used to determine the operating mode when accessing the memory location. In some implementations, a zero value for the memory tag may be used in normal mode.

Once data has been written to the memory, read operations can be performed, for example, by the memory read circuitry of an integrated circuit device to retrieve the data from memory. At block 806, a read request from a data requester is received from a data requestor (e.g., processing unit, DMA engine, etc.) to read the data payload from the memory. The read request can be in the form of one or more read commands, a machine or processor instruction, or certain logic states of one or more control signals. The read request may request reading a certain amount of data such as a dataword, a half cache line, or a full cache line from the memory.

At block 808, in response to the read request, the second data portion of the data payload and the error correction code data are retrieved from the memory, and the first data portion of the data payload can be obtained by performing erasure decoding using the error correction code data. The second data portion of the data payload and the error correction code data can be retrieved, for example, using a read burst length of a certain size (burst length of 4, 8, or 16, etc.) to obtain the requested amount data and the error correction code data. Erasure information can be obtained, and may indicate that certain byte(s) such as the first byte of the codeword(s) corresponding to the retrieve data are erasure locations. Using the erasure information as an input to the error correction decoding process, erasure decoding can be performed, for example, by an error correction decoder, to recover the erased data such as the first data portion (e.g., metadata) and the checksum data.

In some implementations, an ECC check can be performed on the recovered data and the second data portion to determine whether the data retrieved from the memory includes any errors. If the ECC check indicates there are no errors, the first data portion recovered from erasure decoding performed at block 808 and the second data portion retrieved from the memory can be provided to the data requester. If the EEC check performed on the recovered data and the second data portion indicates there are errors in the data retrieved from the memory and/or erasure information indicates the locations of data retrieved from the memory contains erasures, the error magnitude of the total number of errors/ erasures including the erasure associated with the recovered data at block 808 is determined. If the error magnitude of the total number of errors/erasures is within the error correction capability of the error correction encoding scheme, then error correction decoding and/or erasure decoding can be performed to correct any error and/or erasure in the data retrieved from memory, and the corrected data can be provided to the data requester.

If the error magnitude of the total number of errors/ erasures including the erasure associated with the recovered data at block 808 is beyond the error correction capability of the error correction encoding scheme, a determination can be made as to whether treating the error(s) as erasure(s) can reduce the error magnitude to be within the error correction capability of the error correction encoding scheme. For example, referring to the Reed-Solomon encoding scheme described above, the ECC scheme of RS(21,17) can support correcting n–k=4 number of erasures, or an equivalent number of errors at unknown locations in which each error is counted as two erasures. If there are two random errors in the data read from memory, the error magnitude of the total number of errors/erasures is then equivalent to 5 erasures (the two random errors are counted as four erasures, and the recovered data consumed one erasure). Although this error magnitude is beyond the error correction capability of the error correction encoding scheme, if the two random errors are treated as erasures, the error magnitude then becomes three erasures, which is within the error correction capability of the error correction encoding scheme. Hence, even though the data retrieved from the memory may include errors that are uncorrectable using error decoding, the errors may be recoverable if they are processed as erasures. In such a scenario, an error recovery attempt procedure can be performed to search for the locations of the errors. If treating the errors as erasures still result in an error magnitude that is beyond the error correction capability, then an unrecoverable error indication can be generated to indicate that the correct data cannot be obtained. The unrecoverable error indication can be, for example, a memory fault, an interrupt indicating a memory error, etc. In some implementations, the unrecoverable error indication may generate an error or alert message, or may initiate a shutdown procedure.

Figure 9:
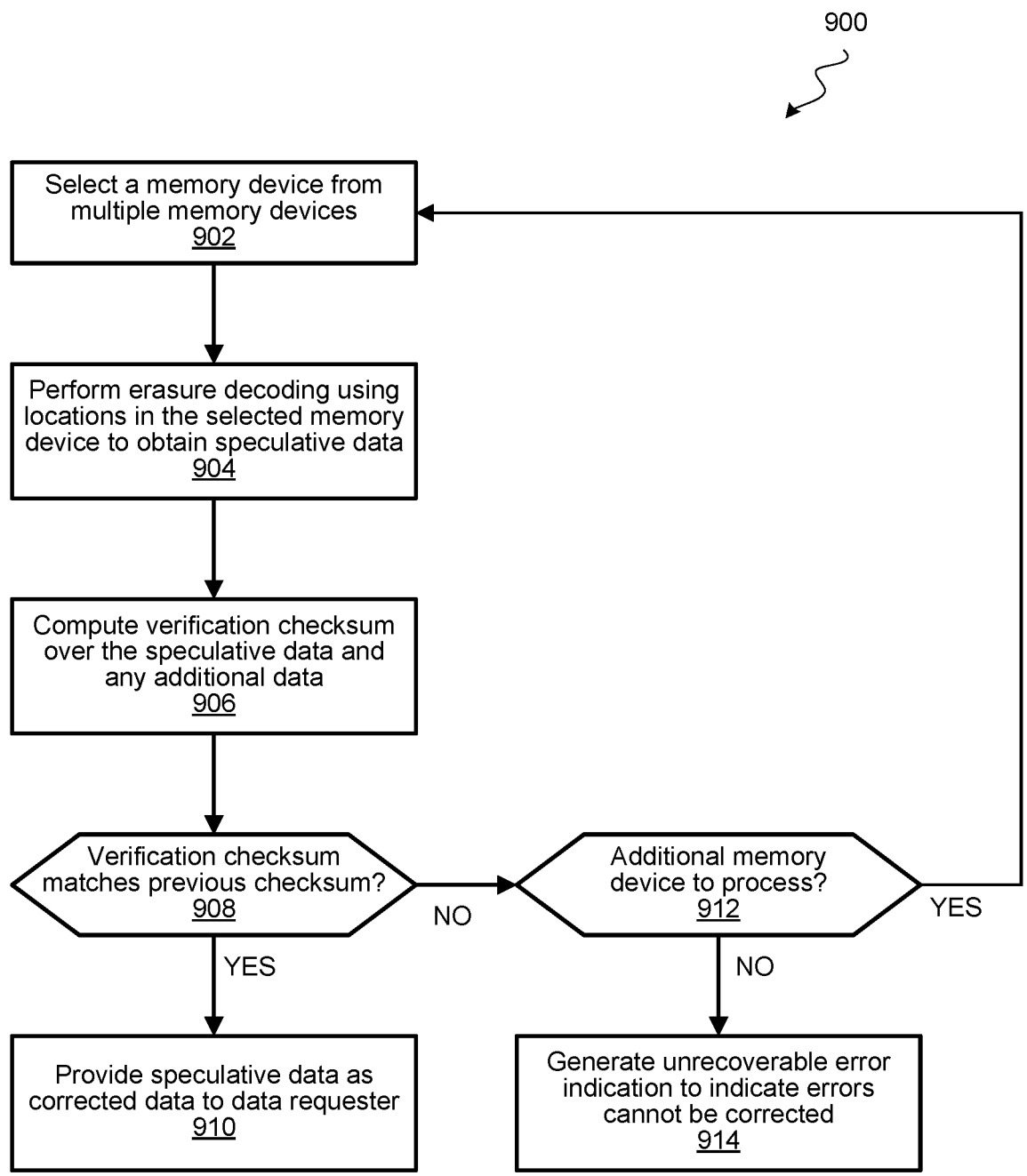
FIG. 9 illustrates a flow diagram of an example of a process for a data recovery attempt.

FIG. 9 illustrates a flow diagram of an example of an error recovery attempt process 900 that can used with a memory that is implemented with a number of memory devices (e.g., DDR5 or other types of memory). In some implementations, process 900 can be performed by an integrated circuit device such as a memory controller (e.g., memory controller 400), or by a memory device or memory module that integrates certain functionalities of a memory controller. In some implementations, process 900 can be performed by an upstream device such as a processing unit or DMA engine that integrates certain functionalities of a memory controller. In some implementations, the steps of process 900 can be performed by various components of an integrated circuit device such as a system-on-chip (SoC) device. It should also be noted that the integrated circuit device performing process 900 can be the same device that performs process 800, or can be a different device or component.

Process 900 may begin at block 902 by selecting a memory device from the multiple memory devices implementing the memory. The memory device can be selected in sequential order or randomly. In some implementations, if the number of previously detected errors or error rate information for each memory device is available, the memory device can be selected based on such information. For example, the memory device most prone to errors can be selected first.

At block 904, the errors at unknown locations are processed as erasures at locations in the selected memory device by performing erasure decoding using the error correction code data to obtain speculative data. In other words, even though the error locations are not known ahead of time, the errors are assumed to have occurred in the selected memory device. Error correction is performed using the symbol locations in the selected memory as the erase information. The corrected data obtained from the erasure decoding is speculative at this point because the errors may have occurred elsewhere, for example, on a different memory device. The portion of the data retrieved from the memory corresponding to the locations in the selected memory device is then replaced with the corrected data to obtain the speculative data.

At block 906, a verification checksum (e.g., CRC-8, CRC-16, etc.) is computed over the speculative data and any additional data recovered from block 808 of process 800 that was used in the computation of the checksum. For example, the verification checksum may be computed over the speculative data and metadata recovered from block 808.

At block 908, a determination is made as to whether the verification checksum matches the checksum that was previously computed when data was written into the memory. If the previously computed checksum matches the verification checksum, then the errors are determined to be at the locations in the selected memory device, and the speculative data can be provided as the correct data to the data requester at block 910. In some implementations, if errors are repeatedly determined to be at the locations in the selected memory, the selected memory device can be identified as a failed device. Erasure information can be updated to indicate that the data symbols at the selected memory device are erasure locations, such that erasure decoding for the selected memory device is performed on subsequent reads. This can be used, for example, to support a chipkill feature to extend the lifespan of the memory by allowing the memory to continue to operate in a computing system despite having a defective memory device.

If the verification checksum fails to match the previously computed checksum, process 900 may continue to block 912 to determine if there are additional memory devices to be processed. If there are remaining memory devices that have not been checked, process 900 returns to block 902 to select another memory device. If all memory devices have been processed and the error recovery attempt operations performed for each of the memory devices fail to find a matching verification checksum, an unrecoverable error indication can then be generated at block 914 to indicate that the errors cannot be corrected. The unrecoverable error indication can be, for example, a memory fault, an interrupt indicating a memory error, etc. In some implementations, the unrecoverable error indication may generate an error or alert message, or may initiate a shutdown procedure.

In some implementations, to provide further assurance that the recovered data is the correct data, the error recovery attempt operations can be performed for every memory device in the memory even if a matching verification checksum has been found. In other words, blocks 902-908 described above can be performed for every memory device in the memory. If there is only one set of erasure locations (e.g., one memory device) that provides the matching verification checksum, then the speculative data corresponding to the matching verification checksum can be provided as the correct data. Although the probability may be low, if multiple sets of erasure locations result in speculative data that yield a matching verification checksum, then it may be unclear as to which data is the correct data. In such a scenario, an unrecoverable error indication can be generated to avoid providing the incorrect data to the data requester even though a matching verification checksum was found.

In some implementations, an unrecoverable error indication can also be generated if different codewords of a read result in different erasure locations that yield a matching verification checksum. For example, referring to FIG. 6, suppose multiple errors were detected in each of codewords CW0 to CW3. However, for codeword CW0, a matching verification checksum was found when assuming erasure locations at memory device Device-1, but for codeword CW1, a matching verification checksum was found when assuming erasure locations at memory device Device-4. This may indicate that the error condition is more severe or more random than just a defective memory device. In such scenarios, an unrecoverable error indication can be generated to avoid providing the incorrect data to the data requester even though a matching verification checksum can be found for the different codewords of a read operation. If the same erasure locations on all codewords yield a matching verification checksum, then the corrected data can be provided to the data requester because the error condition is likely due to a defective memory device. Different combinations of the unrecoverable error conditions can be implemented.

It should also be noted that although error recovery attempt process 900 assumes the errors are located at the same memory device, the error recovery attempt operations can also be performed for the different combinations of possible error locations including locations that are not on the same memory device. For example, referring to data structures 600 and 700, there can be 190 different combinations of two error locations for a codeword that contains 20 symbols. Hence, in some implementations, the operations of blocks 904-908 can be repeated for the 190 different combinations of possible error locations to determine if the errors can be corrected.

Figure 10:
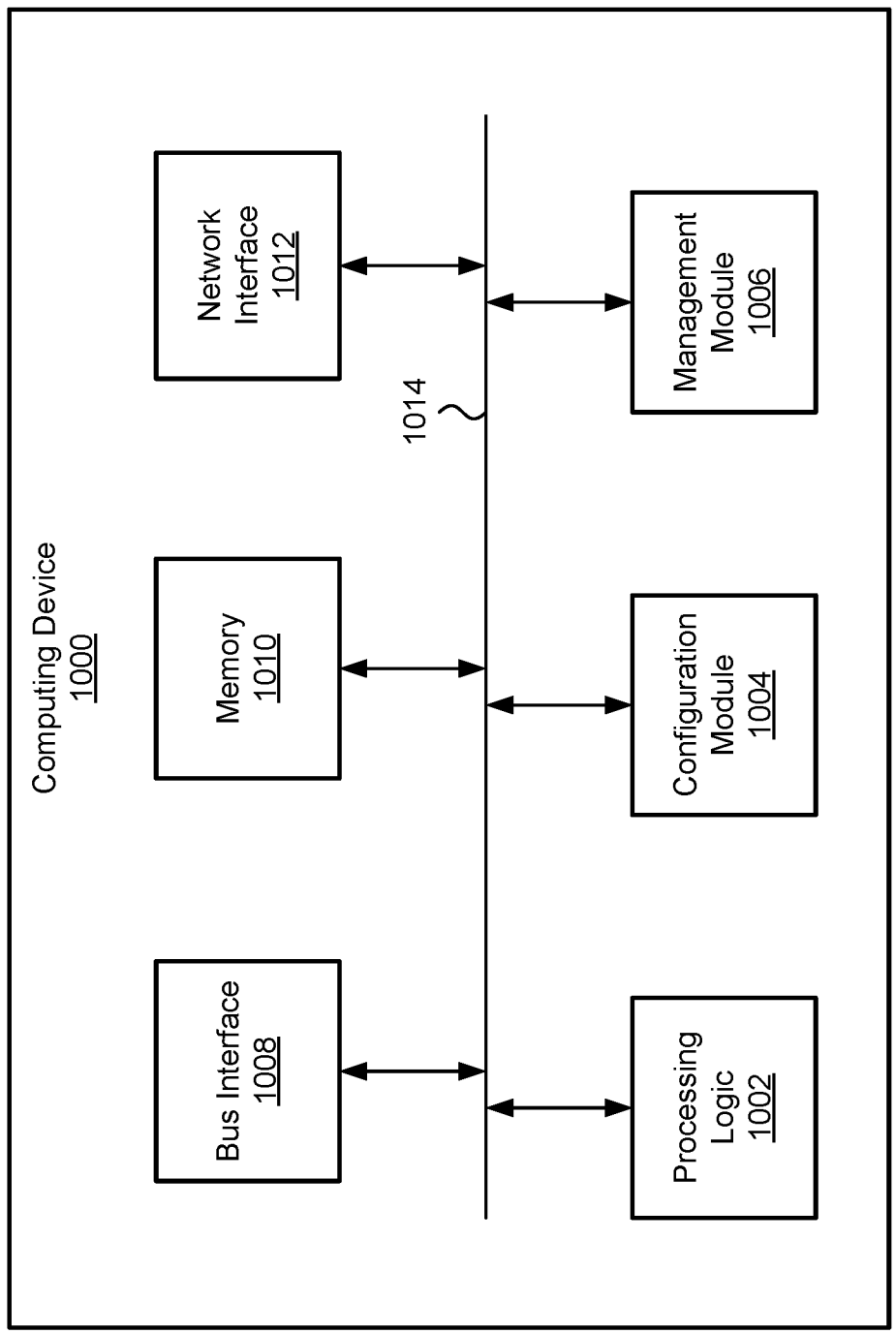
FIG. 10 illustrates a simplified block diagram of an example of a computing system, according to certain aspects of the disclosure.

FIG. 10 illustrates an example of a network device 1000 that may utilize the memory techniques disclosed herein. In one example, the computing device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The computing device 1000 may include additional modules, not illustrated here, such as components discussed with respect to the nodes disclosed in FIG. $$$. In some implementations, the computing device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMID®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the computing device 1000, while in other cases some or all of the memory may be external to the computing device 1000. The memory 1010 may store an operating system comprising executable instructions that, when executed by the processing logic 1002, provides the execution environment for executing instructions providing networking functionality for the computing device 1000. The memory may also store and maintain several data structures and routing tables for facilitating the functionality of the computing device 1000.

In some implementations, the configuration module 1004 may include one or more configuration registers. Configuration registers may control the operations of the computing device 1000. In some implementations, one or more bits in the configuration register can represent certain capabilities of the computing device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the computing device 1000.

In some implementations, the management module 1006 may be configured to manage different components of the computing device 1000. In some cases, the management module 1006 may configure one or more bits in one or more configuration registers at power up, to enable or disable certain capabilities of the computing device 1000. In certain implementations, the management module 1006 may use processing resources from the processing logic 1002. In other implementations, the management module 1006 may have processing logic similar to the processing logic 1002, but segmented away or implemented on a different power plane than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the computing device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network.

This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 1000 may include multiple network interface modules, each configured to communicate with a different network. For example, in these implementations, the computing device 1000 may include a network interface module for communicating with a wired Ethernet network, a wireless 802.11 network, a cellular network, an Infiniband network, etc.

The various components and modules of the computing device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A memory controller for encoding additional data in a memory and retaining a number of error correction code bits used by the memory, the memory controller comprising:
   a host interface;
   an error correction encoder; and
   an error correction decoder,
   wherein the memory controller is configured to:
     receive a write request to write a data payload to the memory comprising a plurality of memory devices, the data payload including data and metadata associated with the data;
     in response to the write request:
       generate a checksum computed over the data payload;
       generate error correction code data computed over the data, the metadata, and the checksum; and
       store the data and the error correction code data without the metadata and without the checksum across the plurality of memory devices;
     receive a read request to read the data payload from the memory; and
     in response to receiving the read request:
       retrieve the data and the error correction code data from the memory; and perform erasure decoding on the data and the error correction code data to obtain the metadata and the checksum, and wherein the data retrieved from the memory includes errors that are uncorrectable by error decoding, and wherein the memory controller is further configured to perform error recovery attempt operations including:

selecting a memory device from the plurality of memory devices;

processing the errors as erasures at locations in the selected memory device by performing erasure decoding using the error correction code data to obtain speculative data;

computing a verification checksum over the speculative data and the metadata; and determining whether the checksum corresponds to the verification checksum.

2. The memory controller of claim 1, wherein the data, the metadata, the checksum, and the error correction code data are organized into code words comprising:

a first code word that includes the metadata, a first portion of the data, and a first error correction code of the error correction code data for the first code word; and a second code word that includes the checksum, a second portion of the data, and a second error correction code of the error correction code data for the second code word.

3. The memory controller of claim 1, wherein the data, the metadata, the checksum, and the error correction code data are organized into code words comprising:

a first code word that includes a first portion of the metadata, a first portion of the data, and a first error correction code of the error correction code data for the first code word;

a second code word that includes a second portion of the metadata, a second portion of the data, and a second error correction code of the error correction code data for the second code word;

a third code word that includes a first portion of the checksum, a third portion of the data, and a third error correction code of the error correction code data for the third code word; and a fourth code word that includes a second portion of the checksum, a fourth portion of the data, and a fourth error correction code of the error correction code data for the fourth code word.

4. An integrated circuit device for encoding additional data in a memory and retaining a number of error correction code bits used by the memory, the integrated circuit device comprising:

memory write circuitry; and memory read circuitry, wherein the memory write circuitry is operable in a memory extension mode to perform memory write extension operations including:

receiving a write request to write a data payload to the memory, the data payload including a first data portion and a second data portion; and storing the second data portion and error correction code data generated for the write request in the memory without the first data portion, wherein the memory read circuitry is operable to perform read operations including:

receiving a read request from a data requester to read the data payload from the memory; and retrieving the second data portion of the data payload and the error correction code data from the memory, wherein the first data portion of the data payload is obtained by performing erasure decoding using the error correction code data, and wherein the memory includes a plurality of memory devices, and the second data portion and the error correction code data are stored across the plurality of memory devices.

5. The integrated circuit device of claim 4, wherein the error correction code data is generated for a data set that includes the data payload and checksum data computed over the data payload.

6. The integrated circuit device of claim 5, wherein the second data portion and the error correction code data retrieved from the memory include errors that are uncorrectable using error decoding, and wherein error recovery attempt operations are performed to determine locations of the errors in the memory.

7. The integrated circuit device of claim 6, wherein the error recovery attempt operations include:

selecting a memory device from the plurality of memory devices;

performing erasure decoding using the locations in the selected memory device to obtain speculative data;

computing a verification checksum over the speculative data and the first data portion; and determining whether the checksum data matches the verification checksum.

8. The integrated circuit device of claim 7, wherein when the checksum data matches the verification checksum, the errors are determined to be at the locations in the selected memory device, and the speculative data is provided as the second data portion to the data requester.

9. The integrated circuit device of claim 7, wherein the selected memory device is identified as a failed device when errors are repeatedly determined to be at the locations in the selected memory device.

10. The integrated circuit device of claim 7, wherein an unrecoverable error indication is generated when the error recovery attempt operations performed for each of the memory devices in the plurality of memory devices fail to find a matching verification checksum.

11. The integrated circuit device of claim 7, wherein an unrecoverable error indication is generated when the error recovery attempt operations performed for each of the memory devices in the plurality of memory devices result in more than one matching verification checksum.

12. The integrated circuit device of claim 7, wherein an unrecoverable error indication is generated when the error recovery attempt operations performed for each codeword of a read result in different locations in different codewords that yield a matching verification checksum.

13. The integrated circuit device of claim 4, wherein the first data portion includes memory tagging extension (MTE) data associated with memory locations storing the second data portion.

14. The integrated circuit device of claim 4, wherein the memory write circuitry is operable in a normal mode to perform operations including:

receiving a write request to write a second data payload to the memory; and storing the second data payload and second error correction code data generated for the second data payload in the memory.

15. A method for encoding additional data in a memory and retaining a number of error correction code bits used by the memory, the method comprising:

receiving a write request to write a data payload to the memory, the data payload including a first data portion and a second data portion;

generating checksum data over the data payload;

generating error correction code data for the write request, wherein the error correction code data is generated for a data set including the data payload and the checksum data;

generating checksum data over the data payload, wherein the error correction code data is generated for a data set including the data payload and the checksum data storing the second data portion and the error correction code data without the first data portion in the memory;

receiving a read request to read the data payload from the memory;

retrieving the second data portion and the error correction code data from the memory; and performing erasure decoding using the error correction code data to obtain the first data portion.

16. The method of claim 15, further comprising:

performing error recovery attempt operations when the second data portion and the error correction code data retrieved from the memory include errors that are uncorrectable by error decoding, the memory comprising a plurality of memory devices, wherein the error recovery attempt operations include:

selecting a memory device from the plurality of memory devices;

processing the errors as erasures at locations in the selected memory device by performing erasure decoding using the error correction code data to obtain speculative data;

computing a verification checksum over the speculative data and the first data portion; and determining whether the checksum data corresponds to the verification checksum.

17. The method of claim 16, further comprising identifying the selected memory device as a failed device when errors are repeatedly determined to be at the locations in the selected memory device.

18. The method of claim 15, wherein the first data portion includes memory tagging extension (MTE) data associated with memory locations storing the second data portion.

19. The method of claim 15, wherein the data payload, the checksum data, and the error correction code data are organized as code words corresponding to a cache line in a computing system.

20. The method of claim 15, wherein the memory is a DDR5 (double data rate 5) memory supporting chipkill feature.

* * * * *